Patented June 7, 1938

2,119,732

UNITED STATES PATENT OFFICE 2,119,732

PROCESS FOR PRODUCING BITUMINOUS EMULSIONS

Lawton B. Beckwith, San Pedro, and Frederick S. Scott, Los Angeles, Calif., assignors to Union Oil Company of California, Los Angeles, Calif., a corporation of California No Drawing. Application October 6, 1934, Serial No. 747,210

8 Claims. (Cl. 134—1)

The present invention relates to aqueous emulsions of bitumen or asphalt, pitches and the like and to a process for producing the same. Such emulsions are suitably employed as binders, adhesives and coating compositions, and are more particularly employed in road building by the so-called "penetration method" which consists essentially in spraying, pouring, or pumping the asphalt emulsion upon the mineral aggregate on the road bed. Roads are also built by pre-mixing the emulsion with the aggregate and then spreading the mixture on the road bed, which is followed by tamping and rolling, or the emulsion may be blade mixed with the aggregate in situ, i. e. on the road bed.

Heretofore, it has been proposed to produce bituminous emulsions for use in road laying and for other commercial purposes by heating the bituminous substance such as asphalt, to a temperature above its melting point, and then adding a saponifiable material to the melted asphalt such as, for example, a fatty acid, rosin or rosin oil. This mixture is then agitated with an aqueous solution of alkali, such as, for example, caustic soda or potash or sodium or potassium carbonate, to effect emulsification of the asphalt.

In recent years, another method has been proposed for producing aqueous bituminous emulsions, which comprises melting the asphalt and then agitating the melted asphalt with a dilute aqueous alkaline solution to effect the emulsification. In this process, the addition of a fatty acid or rosin or rosin oil, or other saponifiable materials to the asphalt is omitted. Emulsification proceeds by the saponification of the natural saponifiable materials such as petroleum acids which are present particularly in the oily fractions of the asphalt itself. An emulsion of this character is of the quick-breaking type, i. e. the emulsion will break rapidly when spread on a surface or brought into contact with mineral aggregate. However, when it is desired to increase the stability of the emulsion and/or its permanency, a small amount of casein or other stabilizing agent is added to the emulsion. This will cause the emulsion to break more slowly and thus will permit mixing with even the finer grades of mineral aggregate.

In making a mixing type emulsion by adding casein to soap type asphalt emulsion produced by addition of rosin oil, for example, it is found that the presence of the rosin oil lowers the efficiency of the casein as a stabilizer, making it necessary to employ larger proportions of casein which is objectionable from the standpoint of economy. Also, the presence of an excessive amount of added saponifiable agent, such as rosin oil, causes re-emulsification of the asphalt during periods of heavy rainfalls and the like.

However, we have discovered that some asphalts such as asphalts produced from certain crude oils as Orcutt, Santa Maria, Torrance, Cat Canyon and Los Angeles Basin and also the harder grades of asphalt having penetrations of 50 or less at 77° F. and obtained from such California crude oils as McKittrick, Coalinga and Poso Creek and mixed with San Joaquin Valley crude oils will not emulsify at all with caustic soda alone as the emulsifying agent or will emulsify only imperfectly with the aid of soaps or other added saponifiable materials. Such emulsions as could be obtained from the foregoing stocks would not be found satisfactory for road construction purposes. Road oils and soft asphalts obtained from such crude oils as McKittrick, Coalinga and Poso Creek and mixed with San Joaquin Valley crude oils can, by careful control, be processed into emulsions having the properties required for road construction purposes. It has been found, however, that the harder grades of asphalts, for example 50 penetration at 77° F. or less, produced from the latter crudes cannot be emulsified by the aid of caustic soda alone and can be emulsified only imperfectly even by the aid of soap or other added emulsifying agents.

It is evident, therefore, that to produce asphalt emulsions which are suitable for commercial utilization as, for example, those produced by emulsification with caustic soda alone, it is necessary not only to choose asphalts produced from certain selected stocks as above mentioned in which the oily fractions of the asphalt contain the requisite amount of petroleum acids necessary to obtain proper emulsification with caustic soda alone or with a minimum amount of soap but to limit the hardness of the asphalt. Commercial requirements for emulsified asphalts normally necessitate the use of asphalt or road oil having a penetration at 77° F. of 100 to 350.

The demand for lubricating oil distillates from those crude oils which are adapted to produce readily emulsifiable asphalts of 100 to 350 penetration at 77° F., such as those produced from Poso Creek crudes and the like, is so great that considerable quantities of such asphalts or crudes are reduced commercially to 40 penetration or lower in order to obtain the desired lubricating oil distillates therefrom. As one feature of our invention, it is proposed to utilize the hard asphalts in emulsions by replacing the valuable oils of such asphalts with oils which are not as valuable for lubricating oil purposes but which are just as satisfactory for emulsification. Thus, lubricating oils separated from such crudes as Orcutt, Santa Maria, Los Angeles Basin and the like can be employed to replace the oil content of asphalts obtained from the Valley crude oils, such as Poso Creek and the like which contain the valuable lubricating oil distillates to produce satisfactory emulsions.

By a satisfactory asphalt emulsion we mean a dispersion of asphalt as the discontinuous phase in water as the continuous phase. Such an emulsion should have a Saybolt furol viscosity of 77° F. of not over 55 seconds, should contain no less than 55% of asphalt, should be sufficiently fine so that upon making a ten days' settlement test, the asphalt content between the top 10% and the bottom 10% should not differ by more than 6% and should contain not more than approximately 1% of saponifiable matter including petroleum acids. Furthermore, a suitable asphaltic emulsion is one which does not gel or increase appreciably in viscosity upon long storage, which is miscible in all proportions with water, and which will not re-emulsify after the emulsion has broken.

We have discovered that any lubricating oil distillate obtained from California crude oils may be emulsified readily by agitating it with slightly alkaline water. A satisfactory asphalt emulsion of 100 or higher penetration at 77° F. can be produced by adding such hard asphalts or difficultly emulsifiable asphalts to such emulsions of lubricating oil distillate produced from any source of crude oil and emulsified with caustic soda alone.

Briefly stated, therefore, we have discovered that if an oil such as an overhead lubricating oil distillate obtained from a California crude oil is first emulsified with alkaline water and without the aid of an added saponifiable agent and then the harder, difficultly emulsifiable asphalt or asphalt which cannot be emulsified with caustic soda alone is gradually added to the emulsified oil and an emulsion of superior quality may be produced without the necessity of employing any saponifiable constituents as rosin oil. In other words, by first emulsifying the oil distillate, emulsification of the hard asphalt or otherwise, non-emulsifiable asphalt can be accomplished. The reason for the phenomena is not entirely clear but it is believed that the overhead distillate contains a substantial amount of the proper kind of emulsifiable petroleum acids which when saponified by means of caustic soda alone aid in the emulsification of the otherwise difficultly emulsifiable asphalt which contains little or none of the saponifiable petroleum acids. Light road oils obtained by reducing such Valley crude oils have from the emulsification standpoint much the same properties as the lubricating oil distillates, although to a lesser degree, simply because the oil has not been all distilled from the crude as occurs in asphalt production. By road oil is meant such topped crudes containing 60 to 95% of 80 penetration at 77° F. asphalt. (A. S. T. M. method D–243–32T.)

We prefer to emulsify the oil or distillate first and then add the asphalt, rather than to blend the asphalt with the oil and emulsify the mixture. The reason for this resides in the fact that we can employ less emulsifying agent such as caustic soda, to effect the emulsification, due to the fact that the petroleum acids present in the oil can be emulsified more readily by the use of caustic soda, or other alkaline material in the absence of the hard asphalt which has a tendency to increase the viscosity and thus increase the particle size for a given degree of agitation of the oil. This increase in particle size makes it difficult for the water and caustic soda to leach out and saponify the petroleum acids of the oil. However, we do not wish to be limited to this procedure, since the invention resides in utilizing such difficultly or otherwise non-emulsifiable asphalt in emulsions. We wish to include in our invention the feature of blending the hard asphalt with the lubricating oil distillate or road oil and then emulsifying the mixture, particularly in cases where the amount of emulsifying agent is not a detrimental item either from a cost standpoint or to meet certain specifications.

We have also discovered that satisfactory asphalt emulsions may be produced from hard asphalts or difficultly emulsifiable asphalts with the aid of a smaller amount of added saponifiable materials when such materials are necessary to effect emulsification of such asphalts than has been found necessary by former processes of emulsification. We have discovered that if the difficultly emulsifiable asphalt such as a Poso Creek asphalt of 50 penetration or less at 77° F. is first emulsified in the presence of the proper amount of added saponifiable material such as rosin or rosin oil and then blended with an oil emulsion in the desired proportions so as to obtain the correct amount of asphalt of desired road application consistency in the blend, we will have obtained a suitable asphalt emulsion containing a minimum amount of added saponifiable material. If we were to blend the lubricating oil distillate with the difficultly emulsifiable asphalt, the result would be that the blend would require the addition of a greater amount of saponifiable constituents such as rosin oil per unit of hard asphalt in the emulsion. The reason for this is also due to the fact that the hard asphalt has a tendency to increase the viscosity and thus the particle size for a given degree of agitation of the oil and thus makes it difficult for the water and emulsifying agent to leach out and saponify the petroleum acids of the oil and in cases where the added saponifiable constituents are added to the melted oil and asphalt prior to emulsification, the viscosity of the mixture also prevents saponification of all of the added saponifiable materials, requiring therefore, a greater quantity of such materials to effect proper emulsification.

It is thus an object of our invention to produce asphalt emulsions from asphalts which cannot be emulsified without the aid of added saponifiable constituents.

It is another object of the invention to emulsify asphalts which are deficient in saponifiable constituents, by first emulsifying an oil such as a lubricating oil distillate or road oil which have sufficient quantities of the proper kind of saponifiable constituents and subsequently incorporating such difficultly emulsifiable asphalts in said oil emulsion.

It is another object of the invention to produce asphaltic emulsions from otherwise difficultly emulsifiable asphalts with caustic soda alone, said emulsions containing substantially little or no added saponifiable constituents and which will have desired demulsibility and resistance to settlement, low viscosities and high asphalt content.

A further object of the invention is to produce satisfactory asphalt emulsions with a minimum amount of added saponifiable materials as rosin or rosin oil and which is accomplished by first emulsifying a lubricating oil distillate or road oil and blending the oil emulsion with an emulsion of an asphalt produced by addition of a saponifiable constituent such as rosin oil.

Other objects and features of our invention will be apparent from the following specific examples of emulsions produced by our process:

*Example 1*

Approximately 20 parts by weight of a lubricating oil obtained by distillation of a Poso Creek crude oil, and having a viscosity of about 100 seconds Saybolt universal at 210° F. is heated to a temperature of approximately 300° F., after which the heated oil is passed through a mixing device comprising a centrifugal pump by means of which an aqueous solution of sodium hydroxide containing approximately 0.2% by weight of caustic soda is intimately mixed with the heated oil. Approximately 44 parts by weight of the solution is mixed with the heated oil. Agitation by circulating the emulsion through the mixing devices is continued until the oil is finely dispersed in the caustic soda solution. By this admixture the temperature of the resulting emulsion will be approximately 150° F. At this temperature, 36 parts by weight of a hard asphalt obtained by steam distilling an Orcutt crude oil down to a melting point of 135° F. and a penetration of 20 at 77° F., is incorporated into the oil emulsion. The hard asphalt is first melted at a temperature of 300° F. and is then gradually incorporated into the circulating stream of oil emulsion until a fine dispersion of blended asphalt is obtained in the resulting emulsion.

*Example 2*

Fifty-seven percent (57%) by weight of a hard asphalt having say, a penetration of 40 at 77° F. obtained by steam distilling a Poso Creek crude oil, is melted at a temperature of about 300° F., and is emulsified by means of a solution of approximately 43% by weight of water containing approximately 0.1 to 0.3% of a neutral or slightly alkaline rosin soap. Emulsification is accomplished in a circulating pump as in the first example. This emulsion will then become a stock emulsion from which other grades of emulsions can be produced. For example, if a penetration type asphalt emulsion containing 57% by weight of 200 penetration asphalt is desired, an emulsion of a heavy lubricating oil distillate, for example, a distillate obtained from a crude oil such as Santa Fe Springs crude having, for example, a viscosity of 100 seconds Saybolt universal at 210° F. is prepared by mixing, for example 57% by weight of the oil with an aqueous solution containing 0.2% of caustic soda. Approximately 60% of the hard asphalt emulsion may then be mixed with approximately 40% of the heavy lubricating oil emulsion to obtain an asphalt emulsion containing 57% of a 200 penetration asphalt.

The emulsions of the foregoing examples comprise penetration type or quick-breaking emulsions. These emulsions may be passed to storage and used as quick-breaking emulsions without further treatment or addition of stabilizers. However, in order to convert such emulsions into the slow breaking type or mixing type emulsions, the hot emulsions may be first cooled to a temperature of about 85–95° F. by circulating such emulsions through the usual cooling coils after which a small amount of casein or other stabilizing agent is mixed into the emulsions. The casein is preferably incorporated as a solution of sodium caseinate prepared by mixing with thorough agitation 20% by weight of casein with the proper amount of cold water and then allowing it to digest in the cold with agitation for a period of 1 to 2 hours. Approximately 1% by weight of sodium hydroxide is added to this mixture with additional agitation. This solution is then added to the emulsion circulating through the centrifugal pump and preferably ahead of the centrifugal pump in such amounts as to obtain about 1% casein on the finished emulsion. After thorough incorporation of the casein into the emulsion, a preservative, preferably formaldehyde, is incorporated into the emulsion. The emulsion is then ready for storage.

It will be observed that instead of employing sodium hydroxide to obtain emulsification of the distillates, we may employ other alkaline materials such as potassium hydroxide, sodium or potassium carbonate, sodium silicate and the like. We may also employ certain alkaline salts or salts of weak acids such as sodium borate or salts of certain weak organic acids such as sodium phenate and sodium cresolate. When using such salts to produce emulsification of the oil, approximately 0.5% by weight based upon the finished emulsion containing the hard asphalt of the alkaline salt is employed. In case the oil emulsion is produced by sodium phenate or sodium cresolate as the emulsifying agent, the use of a preservative for the organic stabilizer may not be necessary.

For the separate emulsification of the hard asphalt, we may employ soap solutions containing such soaps as sodium or potassium oleate, sodium or potassium resinate, sodium or potassium stearate, sodium or potassium palmitate or soaps of fish oil and coconut oil. When using neutral or slightly alkaline soaps of sodium oleate or resinate as emulsifying agents, it has been found that a rather coarse grained emulsion is produced and in order to obtain an emulsion of fine particle size, it is preferable to pass the rough emulsion through a colloid mill prior to addition of a stabilizing agent.

Other stabilizing agents which may be used are glue and blood albumen, starch, gum acacia, agar agar, algin, mucilage forming gums such as tragacanth, pectin, Irish moss, and the like.

The foregoing exemplary description of our invention is not to be considered as limiting since many variations may be made within the scope of the following claims by those skilled in the art without departing from the spirit thereof.

We claim:

1. A process for producing an aqueous bituminous emulsion which comprises commingling a crude oil fraction containing naturally present saponifiable ingredients with a dilute aqueous alkaline solution which is substantially free from saponifiable constituents to produce an oil in water emulsion and subsequently incorporating into said emulsion a melted asphalt which is incapable of being emulsified with said dilute aqueous alkaline solution whereby said asphalt is emulsified by admixture with said preformed emulsion without addition of added saponifiable constituents.

2. A process for producing an aqueous bituminous emulsion which comprises commingling a lubricating oil distillate containing naturally present saponifiable ingredients with a dilute aqueous alkaline solution which is substantially free from saponifiable constituents to produce an oil in water emulsion and subsequently incorporating into said emulsion a melted asphalt which is incapable of being emulsified with said dilute aqueous alkaline solution whereby said asphalt is emulsified by admixture with said preformed emulsion without addition of added saponifiable constituents.

3. A process for producing an aqueous bituminous emulsion which comprises commingling a crude oil fraction containing naturally present saponifiable ingredients with a dilute aqueous alkaline solution which is substantially free from saponifiable constituents to produce an oil in water emulsion, separately emulsifying an asphalt which is incapable of being emulsified with said dilute aqueous alkaline solution with an aqueous solution containing the required amount of added saponifiable materials to emulsify said asphalt and blending said separately produced emulsions.

4. A process as in claim 1 in which said crude oil fraction containing naturally present saponifiable ingredients is a lubricating oil distillate having a viscosity of about 100 seconds Saybolt universal at 210° F.

5. A process as in claim 1 in which the asphalt has a penetration of less than approximately 50 at 77° F.

6. A process as in claim 1 in which the melted asphalt is incorporated in the preformed emulsion in an amount sufficient to produce an emulsion containing an asphalt having a penetration of about 100 to 350 at 77° F.

7. A process as in claim 3 in which the asphalt has a penetration of less than approximately 50 at 77° F.

8. A process as in claim 3 in which the separately produced emulsions are blended in sufficient proportions to produce a blend containing an asphalt having a penetration of about 100 to 350 at 77° F.

LAWTON B. BECKWITH.
FREDERICK S. SCOTT.